United States Patent
Konno et al.

(10) Patent No.: US 11,031,600 B2
(45) Date of Patent: Jun. 8, 2021

(54) LITHIUM ION SECONDARY BATTERY INCLUDING ALUMINUM SILICATE

(71) Applicant: LG ENERGY SOLUTION, LTD., Seoul (KR)

(72) Inventors: Kaoru Konno, Tokyo (JP); Eisuke Haba, Tokyo (JP); Hiroo Nishiyama, Tokyo (JP); Kouichi Takei, Tokyo (JP); Hiroki Mikuni, Tokyo (JP)

(73) Assignee: LG ENERGY SOLUTION, LTD., Seoul (KR)

(*) Notice: Subject to any disclaimer, the term of this patent is extended or adjusted under 35 U.S.C. 154(b) by 0 days.

(21) Appl. No.: 15/537,243

(22) PCT Filed: Dec. 15, 2015

(86) PCT No.: PCT/JP2015/085117
§ 371 (c)(1),
(2) Date: Jun. 16, 2017

(87) PCT Pub. No.: WO2016/098783
PCT Pub. Date: Jun. 23, 2016

(65) Prior Publication Data
US 2018/0006309 A1    Jan. 4, 2018

(30) Foreign Application Priority Data
Dec. 17, 2014    (JP) .............................. JP2014-254729

(51) Int. Cl.
*H01M 4/62*    (2006.01)
*H01M 10/0525*    (2010.01)
(Continued)

(52) U.S. Cl.
CPC .......... *H01M 4/628* (2013.01); *H01M 4/131* (2013.01); *H01M 4/525* (2013.01); *H01M 4/62* (2013.01);
(Continued)

(58) Field of Classification Search
CPC .......... H01M 10/0525; H01M 10/052; H01M 4/131; H01M 4/505; H01M 4/525; Y02E 60/122; Y02T 10/7011
See application file for complete search history.

(56) References Cited

U.S. PATENT DOCUMENTS 6,117,581 A * 9/2000 Shelef ................. H01M 8/1004
429/482
7,771,496 B1 * 8/2010 Nakahara ............ H01M 10/052
29/623.1
(Continued)

FOREIGN PATENT DOCUMENTS

| CN | 1918731 A | 2/2007 |
|---|---|---|
| CN | 104011917 A | 8/2014 |

(Continued)

OTHER PUBLICATIONS

International Search Report for PCT/JP2015/085117 dated Mar. 8, 2016; English translation submitted herewith (5 pages).
(Continued)

*Primary Examiner* — Imran Akram
(74) *Attorney, Agent, or Firm* — Burch, Stewart, Kolasch & Birch, LLP

(57) ABSTRACT

A lithium ion secondary battery includes: a cathode; an anode: a separator; and an electrolytic solution containing lithium hexafluorophosphate (LiPF$_6$) as a lithium salt, wherein the cathode includes a current collector and a cathode mixture formed on the current collector, and wherein the cathode mixture contains an aluminum oxide, a part or an entirety of a surface of the aluminum oxide being coated with carbon.

10 Claims, 1 Drawing Sheet

(51) Int. Cl.
*H01M 4/131* (2010.01)
*H01M 10/0568* (2010.01)
*H01M 4/525* (2010.01)
*H01M 10/052* (2010.01)
*H01M 4/02* (2006.01)

(52) U.S. Cl.
CPC ......... *H01M 4/625* (2013.01); *H01M 10/052* (2013.01); *H01M 10/0525* (2013.01); *H01M 10/0568* (2013.01); *H01M 2004/028* (2013.01); *H01M 2220/30* (2013.01); *H01M 2300/0025* (2013.01)

(56) References Cited

U.S. PATENT DOCUMENTS

| | | | |
|---|---|---|---|
| 2005/0208380 A1 | 9/2005 | Park et al. | |
| 2008/0192407 A1* | 8/2008 | Lu | H01G 11/24 361/502 |
| 2009/0155694 A1* | 6/2009 | Park | H01M 4/131 429/231.95 |
| 2011/0151328 A1* | 6/2011 | Chang | H01M 4/62 429/223 |
| 2012/0177974 A1 | 7/2012 | Nakajima et al. | |
| 2013/0220974 A1* | 8/2013 | Yushin | H01G 11/26 216/56 |
| 2014/0329140 A1* | 11/2014 | Mikuni | C01B 33/26 429/188 |
| 2015/0055276 A1* | 2/2015 | Gadkaree | H01G 11/26 361/502 |
| 2016/0141609 A1* | 5/2016 | Mikuni | H01B 1/08 429/231.8 |
| 2016/0372729 A1* | 12/2016 | Archer | H01M 50/411 |
| 2017/0309888 A1* | 10/2017 | Yu | H01M 4/0428 |

FOREIGN PATENT DOCUMENTS

| | | | | |
|---|---|---|---|---|
| JP | 11-283671 A | | 10/1999 | |
| JP | 2000-77103 A | | 3/2000 | |
| JP | 2003-35509 A | * | 11/2003 | ............. C01B 31/02 |
| JP | 2007-522619 A | | 8/2007 | |
| JP | 2009-152197 A | | 7/2009 | |
| JP | 2012-146477 A | | 8/2012 | |
| JP | 2013-105677 A | | 5/2013 | |
| JP | 2013-179095 A | | 9/2013 | |
| JP | 2014-110122 A | | 6/2014 | |
| JP | 2014-127256 A | | 7/2014 | |
| KR | 2013-0063501 A | | 6/2013 | |
| KR | 2014-0078027 A | | 6/2014 | |
| KR | 2014-0099876 A | | 8/2014 | |
| WO | 2013/073594 A1 | | 5/2013 | |
| WO | 2014/200063 A1 | | 12/2014 | |
| WO | WO-2014200063 A1 | * | 12/2014 | ............... H01B 1/08 |

OTHER PUBLICATIONS

The Journal of Physical Chemistry, vol. 97, No. 27, 1993 Letters (May 10, 1993).

* cited by examiner

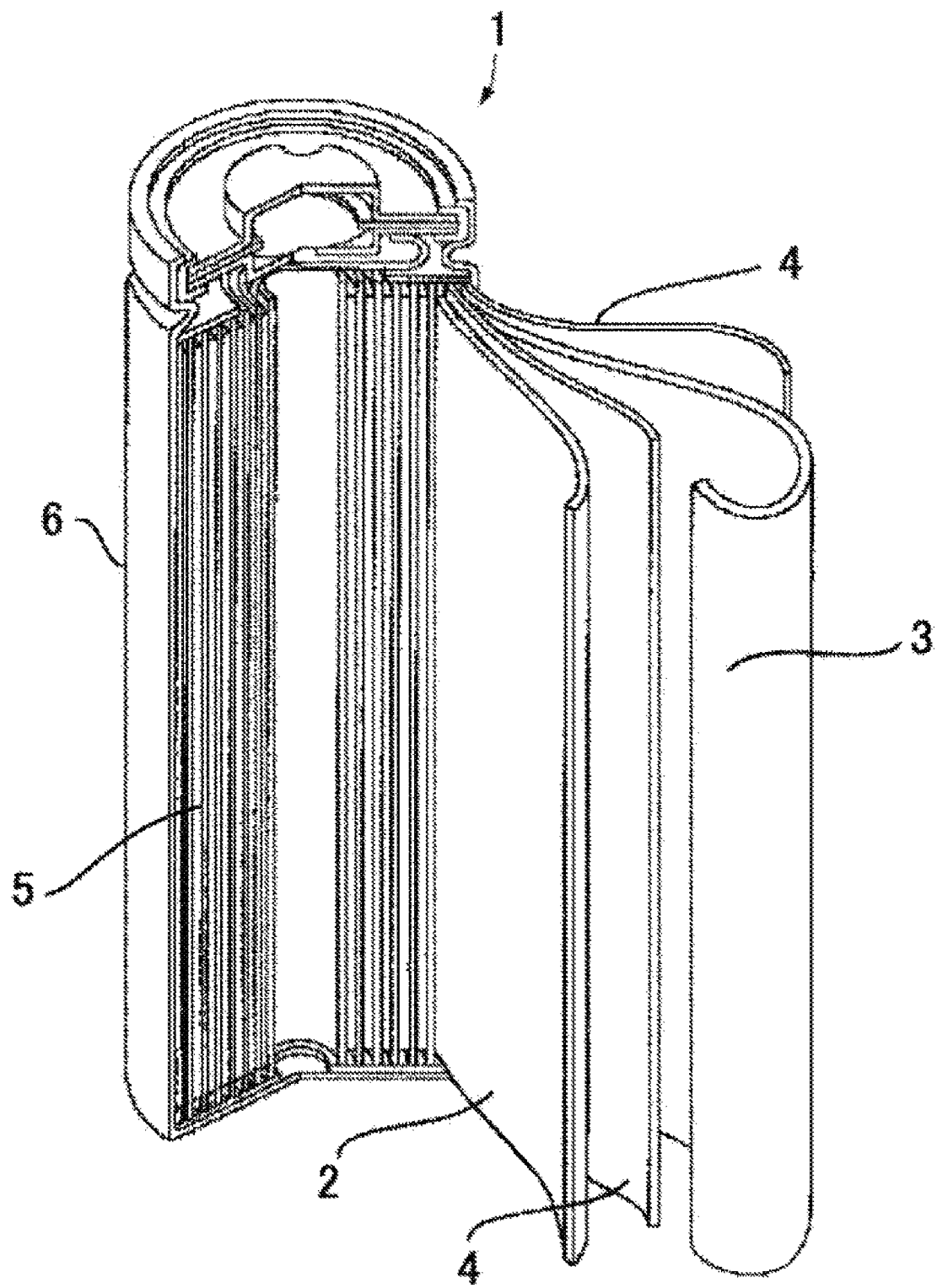

LITHIUM ION SECONDARY BATTERY INCLUDING ALUMINUM SILICATE

CROSS-REFERENCE TO RELATED APPLICATIONS

This application is a U.S. national phase application filed under 35 U.S.C. § 371 of International Application No. PCT/JP2015/085117, filed Dec. 15, 2015, designating the United States, which claims priority from Japanese Patent Application No. 2014-254729, filed Dec. 17, 2014, which are hereby incorporated herein by reference in their entirety.

TECHNICAL FIELD

The present invention relates to a lithium ion secondary battery.

BACKGROUND ART

Lithium ion secondary batteries are secondary batteries which have high energy densities, and which are used as power sources for portable devices such as notebook computers or cell phones that utilize their characteristics. In recent years, with increases in the functionality of portable information terminals including smartphones and tablet PCs, further improvement in the capacities of such lithium ion secondary batteries has been demanded. Examples of means of achieving enhanced capacities of lithium ion secondary batteries include increases in the capacities of active materials, improvement in energy density, and increases in the voltages of the batteries. There has been a problem in that capacities are greatly decreased after charge/discharge cycles because reactions between component materials in the batteries are promoted in the case of increasing the voltages of the batteries.

As methods of suppressing a decrease in capacity after a charge/discharge cycle, (1) a method of using a fluorine-containing salt and a phosphonoacetate compound in an electrolyte, and a zirconium-containing lithium cobalt composite oxide in a cathode (see, for example, Japanese Patent Application Laid-Open (JP-A) No. 2014-127256), (2) a method of using a fluorinated cyclic carbonate ester and a fluorinated chain ester in an electrolytic solution (see, for example, JP-A No. 2014-110122), (3) a method of fixing a rare earth compound to a part of the surface of lithium cobaltate (see, for example, JP-A No. 2013-179095), and the like are proposed.

SUMMARY OF INVENTION

Technical Problem

However, examination by the inventors of the present invention revealed that it is difficult to sufficiently suppress a decrease in capacity maintenance rate at a high potential in the methods described in the documents mentioned above. This is considered to be because a metal such as cobalt is eluted from a cathode active material owing to hydrogen fluoride (HF) generated by the reaction of water included in a lithium ion secondary battery with a fluorine-containing electrolyte such as lithium hexafluorophosphate ($LiPF_6$), and the eluted metal is re-deposited on an anode or the like, whereby the capacity is decreased.

The invention was made under such circumstances, and aims to provide a lithium ion secondary battery in which a decrease in capacity maintenance rate is suppressed even at a high voltage (for example, a charging voltage of 4.35 V).

Solution to Problem

Means for solving the above-described problems includes the following aspects.

<1> A lithium ion secondary battery, comprising:
a cathode;
an anode;
a separator; and
an electrolytic solution comprising lithium hexafluorophosphate ($LiPF_6$) as a lithium salt,
wherein the cathode comprises a current collector and a cathode mixture formed on the current collector, and
wherein the cathode mixture comprises an aluminum oxide, a part or an entirety of a surface of the aluminum oxide being coated with carbon.

<2> The lithium ion secondary battery according to <1>, wherein the aluminum oxide has a mass loss rate of from 0.5% to 30% at from 350° C. to 850° C., measured using a differential thermal-thermogravimetric analyzer (TG-DTA).

<3> The lithium ion secondary battery according to <1> or <2>, wherein the aluminum oxide has a mass loss rate of less than 5% at from 25° C. to 350° C., measured using a differential thermal-thermogravimetric analyzer (TG-DTA).

<4> The lithium ion secondary battery according to any one of <1> to <3>, wherein the aluminum oxide has a specific surface area of from 1 $m^2/g$ to less than 80 $m^2/g$, determined by nitrogen adsorption measurement at 77 K.

<5> The lithium ion secondary battery according to any one of <1> to <4>, wherein the aluminum oxide has a volume mean particle diameter of from 0.5 μm to less than 10 μm, measured by a laser diffraction particle size analyzer.

<6> The lithium ion secondary battery according to any one of <1> to <5>, wherein a content of the aluminum oxide is from 0.1% by mass to 10% by mass with respect to a total amount of the cathode mixture.

<7> The lithium ion secondary battery according to any one of <1> to <6>, wherein the aluminum oxide is an amorphous aluminum silicate compound.

<8> The lithium ion secondary battery according to any one of <1> to <7>, wherein the cathode mixture comprises lithium cobaltate as a cathode active material.

Advantageous Effects of Invention

According to the invention, a lithium ion secondary battery in which a decrease in capacity maintenance rate is suppressed even at a high voltage is provided.

BRIEF DESCRIPTION OF DRAWING

FIG. 1 is a cross-sectional view of one aspect of a lithium ion secondary battery of the present embodiment.

DESCRIPTION OF EMBODIMENTS

The term "step" as used herein encompasses a step independent from another step, as well as a step that is not clearly distinguishable from another step as long as the object of the step is achieved.

A numerical range expressed by "x to y" as used herein includes the values of x and y in the range as the minimum and maximum values, respectively. A numerical range expressed by "A or more" or "A or less" also includes "A" as the minimum or maximum value.

In a numerical range expressed in a stepwise manner herein, the upper or lower limit expressed in one numerical range may be replaced by the upper or lower limit in another numerical range expressed in a stepwise manner. In a numerical range expressed herein, the upper or lower limit of the numerical range may be replaced by values described in the Examples.

In a case in which plural kinds of substances corresponding to each constituent are present in a composition, the content of each constituent in the composition herein means the total content of the plural kinds of the substances present in the composition unless otherwise specified.

In a case in which plural kinds of particles corresponding to each constituent are present in a composition, the particle diameter of each constituent in the composition herein means the value of a mixture of the plural kinds of the particles present in the composition unless otherwise specified.

In the case of viewing a region in which a layer, a film, or a coating is present, the term "layer", "film", or "coating" herein encompasses a case in which the layer, the film, or the coating is formed in the entire region, as well as a case in which the layer, the film, or the coating is formed in only part of the region.

The term "layering" herein refers to layering layers one on another, in which two or more layers may be coupled, or two or more layers may be releasable.

First, an overview of a lithium ion secondary battery is briefly described. The lithium ion secondary battery has a structure in which a cathode, an anode, a separator, and an electrolytic solution are housed in a battery container. The separator is arranged between the cathode and the anode. The separator has a structure (such as a microporous membrane) through which lithium ions released into the electrolytic solution can pass.

A battery charger is connected between the cathode and the anode in a case in which the lithium ion secondary battery is to be charged. During the charging, lithium ions inserted into a cathode active material are desorbed and released into the electrolytic solution. The lithium ions released into the electrolytic solution migrate in the electrolytic solution, pass through the separator, and reach the anode. The lithium ions that have reached the anode are inserted into an anode active material included in the anode.

An external load is connected between the cathode and the anode in a case in which the lithium ion secondary battery is to be discharged. During the discharging, the lithium ions inserted into the anode active material are desorbed and released into the electrolytic solution, and electrons are released from the anode. The lithium ions released into the electrolytic solution migrate in the electrolytic solution, pass through the separator, and reach the cathode. The lithium ions that have arrived at the cathode are inserted into a cathode active material included in the cathode. At this time, the lithium ions are inserted into the cathode active material, whereby electrons flow into the cathode. In such a manner, discharging is caused to occur by the migration of electrons from the anode to the cathode.

The charging and discharging of the lithium ion secondary battery are performed by the insertion/desorption of lithium ions between the cathode active material and the anode active material in such a manner. A configuration example of an actual lithium ion secondary battery will be described later (see, for example, FIG. 1).

The cathode, anode, electrolytic solution, separator, and other configuration members of a lithium ion secondary battery will be described below.

1. Cathode

A cathode (or cathode plate) according to an embodiment of the present invention includes: a current collector; and a cathode mixture formed thereon. The cathode mixture is a layer that is disposed on an upper portion of the current collector and that includes at least a cathode active material. The cathode mixture may be formed only on one side of the current collector, or may be formed on both sides thereof.

The cathode mixture includes: a cathode active material; and an aluminum oxide, a part or an entirety of a surface thereof being coated with carbon (hereinafter also referred to as "carbon-coated aluminum oxide"). The cathode mixture may further include a conductive material, a binder, a thickening material, or the like, if necessary.

(Cathode Active Material)

The cathode active material preferably includes a lithium-containing composite metal oxide. The lithium-containing composite metal oxide is a metal oxide containing lithium and a transition metal, or a metal oxide in which some of transition metals in a metal oxide containing lithium and the transition metals are substituted by heterogeneous elements. Examples of the heterogeneous elements include Na, Mg, Sc, Y, Mn, Fe, Co, Ni, Cu, Zn, Al, Cr, Pb, Sb, and B, and preferred examples thereof include Mn, Al, Co, Ni, and Mg. The lithium-containing composite metal oxide may include one heterogeneous element, or may include two or more heterogeneous elements.

Examples of the lithium-containing composite metal oxide include $LixCoO_2$, $LixNiO_2$, $Li_xCo_yNi_{1-y}O_2$, $Li_xCo_yM_{1-y}O_z$, $Li_xNi_{1-y}M_yO_z$, $LiMPO_4$, $Li_2MPO_4F$ (in each of the formulae, M represents at least one element selected from the group consisting of Na, Mg, Sc, Y, Mn, Fe, Co, Ni, Cu, Zn, Al, Cr, Pb, Sb, V, and B; and x=0 to 1.2, y=0 to 0.9, and z=2.0 to 2.3). The value of x indicating the molar ratio of lithium is increased or decreased by charging and discharging.

Examples of the cathode active material include the lithium-containing composite metal oxides, as well as olivine-type lithium salts, chalcogen compounds, and manganese dioxide. Examples of the olivine-type lithium salts include $LiFePO_4$. Examples of the chalcogen compounds include titanium disulfide and molybdenum disulfide. Such cathode active materials may be used singly, or in combination of two or more kinds thereof.

In a case in which the cathode active material is in a particulate form, examples thereof include massive, polyhedron, spherical, ellipsoidally spherical, plate, acicular, and columnar shapes. In particular, the cathode active material is preferably in the state of secondary particles as an aggregate of primary particles, and is more preferably in the state of secondary particles having a spherical or ellipsoidally spherical shape.

In an electrochemical element such as a battery, a cathode active material in an electrode is expanded and shrunk in response to the charging and discharging of the electrochemical element. Therefore, degradation such as the breakage of the active material or the cutting of a conductive path due to such stresses is likely to occur. Thus, it tends to ameliorate the stress caused by the expansion and shrinkage and to prevent the above-mentioned degradation, when secondary particles formed by the aggregation of primary particles is used as the cathode active material, rather than single particles consisting of primary particles. Meanwhile, use of particles having spherical or ellipsoidally spherical shapes is more likely to result in less expansion/shrinkage of an electrode during the charging and discharging because of resulting in less orientation in the electrode than use of particles with axis orientation properties, such as plate-shaped particles. Also, such particles are more likely to be uniformly mixed with another material such as a conductive material in the formation of a cathode mixture.

The range of the volume average particle diameter (D50) of the cathode active material (or the volume average particle diameter (D50) of secondary particles in a case in which primary particles aggregate to form the secondary particles) is as follows. The lower limit of the range is 0.1 µm or more, preferably 0.5 µm or more, more preferably 1 µm or more, and still more preferably 3 µm or more, from the viewpoint of facilitating the obtainment of a desired tap density. The upper limit thereof is 20 µm or less, preferably 18 µm or less, more preferably 16 µm or less, and still more preferably 15 µm or less, from the viewpoint of enabling further improvement in electrode formation properties and battery performance. The tap density (or filling properties) may be improved by mixing two or more kinds of cathode active materials having different volume average particle diameters (D50) as the cathode active material. The volume average particle diameter (D50) may be determined from a particle size distribution determined by a laser diffraction/scattering method. The laser diffraction method may be carried out using, for example, a laser diffraction particle size analyzer (such as SALD3000J, available from SHIMADZU CORPORATION). Specifically, particles are dispersed in a dispersion medium such as water to prepare a dispersion liquid. For the dispersion liquid, a particle diameter (D50) achieving an accumulation of 50% is determined as the volume average particle diameter in a case in which a volume cumulative distribution curve is drawn from a smaller-diameter side using the laser diffraction particle size analyzer.

The range of the average particle diameter of primary particles in a case in which the primary particles aggregate to form secondary particles is as follows. The lower limit of the range is 0.01 µm or more, preferably 0.05 µm or more, still more preferably 0.08 µm or more, and particularly preferably 0.1 µm or more, from the viewpoint of favorable charge/discharge reversibility. The upper limit thereof is 3 µm or less, preferably 2 µm or less, still more preferably 1 µm or less, and particularly preferably 0.6 µm or less, from the viewpoint of further improving the battery performance such as an output characteristic.

The range of the BET specific surface area of the cathode active material is as follows. The lower limit of the range is 0.1 $m^2/g$ or more, preferably 0.2 $m^2/g$ or more, and still more preferably 0.3 $m^2/g$ or more, from the viewpoint of further improving the battery performance. The upper limit thereof is 4.0 $m^2/g$ or less, preferably 2.5 $m^2/g$ or less, and still more preferably 1.5 $m^2/g$ or less, from the viewpoint of superior electrode formation properties.

The BET specific surface area is measured based on a nitrogen adsorption ability in accordance with JIS Z 8830 (2001). Examples of evaluation apparatuses which can be used include a nitrogen adsorption measurement apparatus (AUTOSORB-1, available from QUANTACHROME). In a case in which the BET specific surface area is to be measured, a pretreatment of removing water by heating is first performed, since the water adsorbed on a surface of a sample and in the structure of the sample is considered to affect the gas adsorption ability.

In the pretreatment, 0.05 g of a measurement sample is put in a measurement cell, and the measurement cell is then depressurized to 10 Pa or less using a vacuum pump, heated at 110° C., and maintained for 3 hours or more. Then, the cell is naturally cooled to ordinary temperature (25° C.) while keeping the depressurization state. After the pretreatment, measurement is carried out in an evaluation pressure range of less than 1 on a relative pressure (equilibrium pressure with respect to saturated vapor pressure) basis at an evaluation temperature set at 77 K.

(Carbon-Coated Aluminum Oxide)

The carbon-coated aluminum oxide has a structure in which a part or an entirety of the surface of a particulate aluminum oxide is coated with carbon. Examples of aluminum oxide include activated alumina and aluminum silicate compounds. Examples of aluminum silicate compounds include aluminum silicates such as allophene, kaoline, zeolite, saponite, or imogolite. Of these, amorphous aluminum silicate compounds which enable a specific surface area to be easily adjusted in order to improve cycle characteristics are preferred.

The amorphous aluminum silicate compound is an aluminum silicate having an elemental molar ratio Si/Al of from 0.3 to 5.0. Examples of such aluminum silicates include an aluminum silicate having a composition represented by $nSiO_2.Al_2O_3.mH_2O$ [n=0.6 to 10.0, m=0 or more].

The aluminum oxide may be synthesized, or a commercially available product may be purchased and used as the aluminum oxide.

Examples of synthesis method of synthesizing an aluminum silicate as the aluminum oxide include a method including the steps of: mixing a solution containing silicate ions with a solution containing aluminum ions to obtain a reaction product; and heat treating the reaction product in the presence of an acid in an aqueous medium. The method may further include another step, if necessary. The method preferably includes a washing step of performing deionization and solid separation, at least after the step of heat treatment, preferably before and after the heat treatment step, from the viewpoint of the yield of the obtained aluminum oxide, structure formation, or the like.

It is possible to efficiently produce an aluminum oxide superior in metal ion adsorption ability by deionizing coexisting ions from a solution containing an aluminum oxide which is a reaction product, followed by a heat treatment in the presence of an acid. Examples of the coexisting ions include sodium ions, chloride ions, perchlorate ions, nitrate ions, and sulfate ions.

The above may be considered as follows, for example. The aluminum oxide from which the coexisting ions inhibiting the formation of a regular structure have been removed, is heat treated in the presence of the acid, whereby an aluminum oxide having a regular structure is formed.

A method of coating the surface of an aluminum oxide with carbon is not particularly limited. Examples thereof include a method in which an organic compound (carbon precursor) that is changeable into a carbonaceous material by a heat treatment is attached to an aluminum oxide, followed by a heat treatment to change the organic compound into the carbonaceous material. Examples of a method of attaching the organic compound to the aluminum oxide include: a wet method in which a particulate aluminum oxide as a nucleus is added to a mixed solution obtained by dissolving or dispersing an organic compound in a solvent, followed by removing of the solvent by heating or the like; a dry method in which a mixture obtained by mixing a particulate aluminum oxide with a solid organic compound is applied while being kneaded and applying a shear force to the mixture; and a gas phase method such as CVD. A dry method and a gas phase method in which no solvent is used are preferred from the viewpoint of reducing a production cost and production processes.

The organic compound (carbon precursor) that is changeable into a carbonaceous material by a heat treatment is not particularly limited. Examples of usable carbon precursor include ethylene heavy end pitch, crude oil pitch, coal tar pitch, asphalt-decomposed pitch, pitch generated by thermal decomposition of polyvinyl chloride or the like, and synthetic pitch produced by polymerizing naphthalene or the like in the presence of a super strong acid. Examples of materials classified into thermoplastic resins include polyvinyl chloride, polyvinyl alcohol, polyvinyl acetate, and polyvinyl butyral. Examples of materials classified into thermosetting resins include phenolic resin and furan resin.

Conditions under which the aluminum oxide on which the organic compound is attached to the surface thereof is heat-treated may be selected in consideration of the carbonization rate of the organic compound, and is not particularly limited. For example, the heat treatment temperature is preferably from 800° C. to 1300° C. When the heat treatment temperature is 800° C. or more, it tends to cause baking of organic substances to sufficiently proceed, and to result in suppression of an increase in initial irreversible capacity caused by an excessively large specific surface area. When the heat treatment temperature is less than 1300° C., it tends to result in suppression of an increase in resistance caused by an excessively small specific surface area. It is preferable to perform the heat treatment in an inert atmosphere. Examples of the inert atmosphere include nitrogen, argon, helium, and combinations thereof.

The BET specific surface area of the carbon-coated aluminum oxide is preferably 80 m²/g or less. From the viewpoint of cycle characteristics and storage characteristics, the BET specific surface area is more preferably 40 m²/g or less, and still more preferably 20 m²/g or less. The lower limit of the BET specific surface area of the carbon-coated aluminum oxide is not particularly limited, and is preferably 1 m²/g or more, more preferably 2 m²/g or more, and still more preferably 3 m²/g or more, from the viewpoint of improving the ability of adsorption of hydrogen fluoride and metal ions.

The BET specific surface area of the carbon-coated aluminum oxide is measured based on a nitrogen adsorption ability in accordance with HS Z 8830 (2001). Examples of an evaluation apparatus usable herein include a nitrogen adsorption measurement apparatus (such as AUTOSORB-1, available from QUANTACHROME). When the BET specific surface area is to be measured, a pretreatment of removing water by heating is first performed, since the water adsorbed on a surface of a sample and in the structure of the sample is supposed to affect the gas adsorption ability.

In the pretreatment, 0.05 g of a measurement sample is put in a measurement cell, and the measurement cell is then depressurized to 10 Pa or less using a vacuum pump, then heated at 110° C., and maintained for 3 hours or more. Then, the cell is naturally cooled to ordinary temperature (25° C.) while keeping the depressurization state. After the pretreatment, measurement is carried out in an evaluation pressure range of less than 1 on a relative pressure (equilibrium pressure with respect to saturated vapor pressure) basis at an evaluation temperature set at 77 K.

From the viewpoint of further improving a battery capacity and cycle characteristics, the carbon-coated aluminum oxide preferably has a mass loss rate (D1) at from 25° C. to 350° C., measured using a differential thermal-thermogravimetric analyzer (TG-DTA), of less than 5%, more preferably less than 4%, and still more preferably less than 3%. The lower limit of the mass loss rate (D1) is preferably 0.01% or more from the viewpoint of practical utility.

From the viewpoint of input-output characteristics and cycle characteristics, the carbon-coated aluminum oxide preferably has a mass loss rate (D2) at from 350° C. to 850° C., measured using a differential thermal-thermogravimetric analyzer (TG-DTA), of from 0.5% to 30%, more preferably from 2% to 25%, and still more preferably from 5% to 20%. When the mass loss rate (D2) is within the ranges, it tends to result in suppression of an increase in resistance caused by the reaction of the particle surface of the carbon-coated aluminum oxide with an electrolytic solution, and tends to result in superior ability of adsorption of hydrogen fluoride, metal ions, and the like.

The mass loss rate (D1) may be measured by raising a temperature from 25° C. to 350° C. at a temperature-raising rate of 10° C./min under the flow of dry air. The mass loss rate (D1) is set at a value determined by the following Expression (1). In the expression, W0 represents a mass at 25° C., and W1 represents a mass at 350° C.

$$D1(\%)=\{(W0-W1)/W0\}\times 100 \qquad \text{Expression (1)}$$

The mass loss rate (D2) may be measured based on a mass obtained by raising a temperature from 350° C. to 850° C. at a temperature-raising rate of 10° C./min under the flow of dry air, followed by maintaining at 850° C. for 20 minutes. The mass loss rate (D2) is a value determined by the following Expression (2). In the expression, W1 represents a mass at 350° C., and W2 represents a mass at 850° C.

$$D2(\%)=\{(W1-W2)/W1\}\times 100 \qquad \text{Expression (2)}$$

The mass loss rate of the carbon-coated aluminum oxide may be calculated by measurement using, for example, a TG-DTA-6200 type (available from SII NanoTechnology Inc.) as a differential thermal-thermogravimetric analyzer.

The mass loss rate (D1) at from 25° C. to 350° C. is preferably less than 5%, more preferably less than 4%, and still more preferably less than 3%, from the viewpoint of further improving a battery capacity and cycle characteristics. The lower limit of the mass loss rate (D1) at from 25° C. to 350° C. is preferably 0.01% or more from the viewpoint of practical utility.

The mass loss rate (D2) at from 350° C. to 850° C. is preferably from 0.5% to 30%, more preferably from 2% to 25%, and still more preferably from 5% to 20%, from the viewpoint of input-output characteristics and cycle characteristics. When the mass loss rate is within the ranges, it is possible to suppress an increase in resistance caused by the reaction of the particle surface of the carbon-coated aluminum oxide with an electrolytic solution.

The volume average particle diameter (D50) of the carbon-coated aluminum oxide is not particularly limited, and may be selected in accordance with the desired final size. For example, the volume average particle diameter (D50) may be from 0.1 μm to 50 μm, and is preferably from 0.5 μm to 10 μm, and more preferably 0.5 μm or more and less than 10 μm. When the volume average particle diameter (D50) of the carbon-coated aluminum oxide is 0.1 μm or more, the viscosity of slurry tends to be suppressed from increasing during the production of a cathode mixture, and workability tends to be favorably maintained. When the volume average particle diameter (D50) of the carbon-coated aluminum oxide is 50 μm or less, streaks tend to be inhibited from being generated during the production (coating) of a cathode mixture The volume average particle diameter (D50) of the carbon-coated aluminum oxide is more preferably 8 μm or less, and still more preferably 5 µm or less, from the viewpoint of improving the ability of adsorption of hydrogen fluoride, metal ions, and the like.

The volume average particle diameter of the carbon-coated aluminum oxide is measured by a laser diffraction method. The laser diffraction method may be carried out using, for example, a laser diffraction particle size analyzer (such as SALD3000J, available from SHIMADZU CORPORATION). Specifically, the carbon-coated aluminum oxide is dispersed in a dispersion medium such as water to prepare a dispersion liquid. For the dispersion liquid, a particle diameter (D50) achieving an accumulation of 50% is determined as the volume average particle diameter, in a case in which a volume cumulative distribution curve is drawn from a smaller-diameter side using the laser diffraction particle size analyzer.

The content of the carbon-coated aluminum oxide may be, for example, from 0.1% by mass to 10% by mass, and preferably from 0.1% by mass to 7% by mass, with respect to the total amount of cathode mixture. The content of the carbon-coated aluminum oxide is more preferably from 0.1% by mass to 5% by mass with respect to the total amount of cathode mixture from the viewpoint of improvement in battery density.

(Conductive Material)

The cathode preferably includes a conductive material from the viewpoint of further improving battery performance. Examples of the conductive material include black leads (graphite) such as natural graphite, artificial graphite, or fibrous graphite, and carbon blacks such as acetylene black. The conductive material preferably includes a carbon black, and more preferably includes acetylene black.

When a carbon black is used as the conductive material, it is preferable that the carbon black is in the form of particles having an average particle diameter of from 20 nm to 100 nm. Examples of the particles herein include particles having, for example, granular, flaky, spherical, columnar, or irregular shapes. The "granular shape" is not an irregular shape but is a shape having approximately equal dimensions (refer to JIS Z2500: 2000). The flaky shape (flake shape) is a shape such as a plate shape (refer to JIS Z2500: 2000). The flaky shape is also referred to as a scaly shape because of being the shape of a thin plate such as a scale. In the present embodiment, a shape having an aspect ratio (i.e., particle diameter a/average thickness t) ranging from 2 to 100, shown by an analysis performed based on the results of SEM observation, is regarded as the flake shape. The particle diameter a is defined as the square root of the area S of two-dimensionally viewed particles having a flake shape, and is regarded as the particle diameter of the conductive material. The "spherical shape" is a shape similar to the shape of a sphere (see JIS Z2500: 2000). The shape is not necessarily a true-spherical shape but is a shape in which the ratio (DL)/(DS) (which may also be referred to as "sphericity coefficient" or "sphericity") between the major diameter (DL) and minor diameter (DS) of a particle ranges from 1.0 to 1.2, and the particle diameter refers to the major diameter (DL). Examples of the columnar shape include generally circular column and generally polygonal column shapes. The particle diameter of a particle having the columnar shape refers to the height of the column.

The average particle diameter of the conductive material is an arithmetic average value of the diameters of particles, measured for all images of the particles in an image obtained by photographing the particles at a magnification of 200,000 times with a scanning electron microscope.

In a case in which a carbon black is used as the conductive material, the average particle diameter of the carbon black is preferably from 20 nm to 100 nm, more preferably from 30 nm to 80 nm, and still more preferably from 40 nm to 60 nm, from the viewpoint of superior dispersibility of the cathode mixture and superior input-output characteristics of the battery.

In a case in which a graphite is used as the conductive material, the average particle diameter of the graphite is preferably from 1 µm to 10 µm. The graphite preferably has an interlayer spacing (d002) between the carbon layer planes of from 0.3354 nm to 0.337 nm in a wide-angle X-ray diffraction method.

In a case in which a combination of a carbon black and a graphite is used as the conductive material, the ratio between a carbon black and a graphite is not particularly limited. For example, the mass ratio between the mass A1 of a carbon black and the mass A2 of a graphite, i.e., A1/(A1+A2) is preferably from 0.1 to 0.9, and more preferably from 0.4 to 0.85, from the viewpoint of the charge-discharge characteristics of the battery.

When a conductive material is used, the content thereof is preferably 0.1% by mass or more, more preferably 0.2% by mass or more, and still more preferably 0.5% by mass or more, with respect to the total amount of cathode mixture. The upper limit of the content of a conductive material is preferably 30% by mass or less, more preferably 20% by mass or less, and still more preferably 10% by mass or less. When the content of a conductive material is within the ranges, superior battery capacity and superior input-output characteristics are attained.

When a carbon black is used as the conductive material, the content thereof is preferably from 0.1% by mass to 15% by mass, more preferably from 0.2% by mass to 10% by mass, and still more preferably from 0.5% by mass to 5% by mass, with respect to the total amount of the cathode mixture, from the viewpoint of conductivity and a higher capacity. When the content is within the ranges, superior battery capacity and superior input-output characteristics are attained.

(Binder)

The cathode mixture preferably includes a binder from the viewpoint of attaining adhesiveness between the cathode mixture and the current collector and attaining adhesiveness among cathode active materials. The kind of the binder is not particularly limited. It is preferable to select a material having favorable solubility and dispersibility in a dispersion solvent in a case in which the cathode mixture is formed by, for example, a coating method.

Examples of the binder include: resinous polymers such as polyethylene, polypropylene, polyethylene terephthalate, polymethyl methacrylate, polyimides, aromatic polyamides, cellulose, or nitrocellulose; rubber-like polymers such as SBR (styrene-butadiene rubber), NBR (acrylonitrile-butadiene rubber), fluororubber, isoprene rubber, butadiene rubber, or ethylene-propylene rubber; thermoplastic elastomer polymers such as styrene-butadiene-styrene block copolymer or a hydrogenated product thereof, EPDM (ethylene-propylene-diene tercopolymer), styrene-ethylene-butadiene-ethylene copolymer, or styrene-isoprene-styrene block copolymer or a hydrogenated product thereof; soft resinous polymers such as syndiotactic-1,2-polybutadiene, polyvinyl acetate, ethylene-vinyl acetate copolymer, or propylene-α-olefin copolymer; fluorine-containing polymers such as polyvinylidene fluoride (PVdF), polytetrafluoroethylene, fluorinated polyvinylidene fluoride, polytetrafluoroethylene-ethylene copolymer, or polytetrafluoroethylene-vinylidene fluoride copolymer; and polymeric compositions having alkali metal ion (particularly, lithium ion) conductivity. Such binders may be used singly, or in combination of two or more kinds thereof. It is preferable to use a fluorine-containing polymer such as polyvinylidene fluoride (PVdF) or polytetrafluoroethylene-vinylidene fluoride copolymer from the viewpoint of the stability of the cathode.

In a case in which the cathode mixture contains a binder, the content of the binder is preferably 0.5% by mass or more, more preferably 1% by mass or more, and still more preferably 2% by mass or more, with respect to the total amount of the cathode mixture. The content is preferably 50% by mass or less, more preferably 40% by mass or less, still more preferably 30% by mass or less, and particularly preferably 10% by mass or less, with respect to the total amount of the cathode mixture. Battery performance such as cycle characteristics is capable of being more favorable by setting the content of the binder in the above-described ranges.

A method of forming a cathode mixture on a current collector is not particularly limited, and examples thereof include a dry method and a wet method. The dry method is a method in which the materials of a cathode mixture are mixed and made into a sheet form in a dry process, and the resultant is attached to a current collector by pressure. The wet method is a method in which the materials of a cathode mixture is dissolved or dispersed in a dispersion solvent to make a slurry, and the slurry is applied to a current collector, followed by drying.

The kind of the dispersion solvent for forming the slurry is not limited, as long as the dispersion solvent is a solvent capable of dissolving or dispersing the materials included in a cathode mixture. Either an aqueous medium or an organic solvent may be used as the dispersion solvent. Examples of the aqueous medium include water, and a mixed solvent of an alcohol and water. Examples of the organic solvent include N-methyl-2-pyrrolidone (NMP), dimethylformamide, dimethylacetamide, methyl ethyl ketone, cyclohexanone, methyl acetate, methyl acrylate, diethyltriamine, N,N-dimethylaminopropylamine, tetrahydrofuran (THF), toluene, acetone, diethyl ether, dimethylacetamide, hexamethylphosphoramide, dimethyl sulfoxide, benzene, xylene, quinoline, pyridine, methylnaphthalene, and hexane. It is preferable to use a thickening material particularly in a case in which an aqueous medium is used. Such dispersion solvents may be used singly, or in combination of two or more kinds thereof.

The thickening material is not particularly limited. Specific examples thereof include carboxymethyl cellulose, methyl cellulose, hydroxymethyl cellulose, ethyl cellulose, polyvinyl alcohol, oxidized starch, phosphorylated starch, casein, and salts thereof. Such thickening materials may be used singly, or in combination of two or more kinds thereof.

It is preferable to compress the cathode mixture formed on a current collector by hand pressing, roller pressing, or the like, in order to improve the filling density (packing density) of the cathode active material.

The material of the current collector for a cathode is not particularly limited. Examples thereof include metallic materials such as aluminum, stainless steel, nickel plating, titanium, or tantalum, and carbonaceous materials such as carbon cloth or carbon paper. Among them, metallic materials are preferred, and aluminum is more preferred.

The shape of the current collector is not particularly restricted. Examples of metallic materials include metal foils, metal columns, metal coils, metal plates, metallic thin films, expanded metals, punched metals, and metal foams. Examples of carbonaceous materials include carbon plates, carbon thin films, and carbon columns. Among them, it is preferable to use a metallic thin film. The thin film may be formed into a mesh form.

The thickness of the current collector is not particularly limited, and is preferably 1 µm or more, more preferably 3 µm or more, and still more preferably 5 µm or more. The thickness of the current collector is preferably 1 mm or less, more preferably 100 µm or less, and still more preferably 50 µm or less. Sufficient strength tends to be obtained in a case in which the thickness of the current collector is 1 µm or more. Superior flexibility and superior workability tend to be obtained in a case in which the thickness of the current collector is 1 mm or less.

It is preferable that the cathode mixture has a density of from 3.0 g/cm$^3$ to 4.0 g/cm$^3$, and a coating amount thereof on one surface of a current collector (i.e., single application amount) is preferably from 100 g/m$^2$ to 300 g/m$^2$. Input-output characteristics are further improved in a case in which the density of the cathode mixture is within the above-described range. From such a viewpoint, the single application amount of a cathode mixture on a cathode current collector is more preferably from 150 g/m$^2$ to 250 g/m$^2$, and still more preferably from 185 g/m$^2$ to 220 g/m$^2$.

2. Anode

The anode (anode plate) according to an embodiment of the invention includes: a current collector; and an anode mixture formed thereon. The anode mixture is a layer that is disposed on an upper portion of a current collector and that includes at least an anode active material which is capable of electrochemically occluding/releasing lithium ions. The anode mixture may be formed only on one side of a current collector, or may be formed on both sides thereof. The anode mixture may further include a conductive material, a binder, a thickening material, or the like, if necessary.

(Anode Active Material)

Examples of the anode active material include carbonaceous materials, metal oxides such as tin oxide or silicon oxide, metal composite oxides, simple-substance lithium, lithium alloys such as lithium-aluminum alloy, and metals capable of forming alloys with lithium, such as Sn or Si. The anode active materials may be used singly, or in combination of two or more kinds thereof. Among them, a carbonaceous material or a lithium composite oxide is preferred from the viewpoint of safety.

The metal composite oxide is not the particularly limited as long as it is a metal composite oxide capable of occluding and releasing lithium, and is preferably a metal composite oxide containing at least one of Ti (titanium) or Li (lithium) from the viewpoint of high-current-density charge-discharge characteristics.

Examples of the carbonaceous materials include: amorphous carbon; natural graphite; a composite carbonaceous material in which a coating film is formed on natural graphite by a dry chemical vapor deposition (CVD) method or a wet spray method; an artificial graphite obtained by baking a resin raw material such as an epoxy or a phenol, or a pitch-based material obtained from petroleum, coal, or the like; and amorphous carbon materials.

Other examples of the anode active material include lithium metals capable of occluding/releasing lithium by forming a compound with lithium, and oxides or nitrides of Group 14 elements (such as silicon, germanium, or tin) capable of occluding/releasing lithium by forming a compound with lithium to insert the lithium into a crystalline pore.

In particular, the carbonaceous materials have high conductivity, and are excellent as anode active materials in view of low-temperature characteristics and cycle stability. Of the carbonaceous materials, materials (amorphous carbons) having a wide interlayer spacing between carbon layer planes (d002) are preferred from the viewpoint of high input-output characteristics. A carbonaceous material having in interlayer spacing between carbon layer planes (d002) of 0.39 nm or less is preferred from the viewpoint of battery characteristics. Examples of the materials (amorphous carbons) having a wide interlayer spacing between carbon layer planes (d002) include hard carbons and soft carbons. The soft carbons are preferred from the viewpoint of cycle characteristics. Such a soft carbon preferably has an interlayer spacing between carbon layer planes (d002) of from 0.34 nm to 0.36 nm, more preferably from 0.341 nm to 0.355 nm, and still more preferably from 0.342 nm to 0.35 nm in a wide-angle X-ray diffraction method.

Graphite is preferred from the viewpoint of attaining a higher capacity. A graphite preferably has an interlayer spacing between carbon layer planes (d002) of less than 0.34 nm, and more preferably from 0.3354 nm to 0.337 nm in a wide-angle X-ray diffraction method.

Such a carbonaceous material may also be referred to as a pseudo-anisotropic carbon. A mixture of carbonaceous materials having high conductivity, such as a graphite material, an amorphous material, or activated carbon, may also be used as an anode active material.

(Conductive Material)

The anode may include a conductive material. For example, the anode may further contain, as a conductive material, a second carbonaceous material having a property different from the property of the first carbonaceous material used as the anode active material. Examples of the property include an X-ray diffraction parameter, a median diameter, an aspect ratio, a BET specific surface area, an orientation ratio, a Raman R value, a tap density, a true density, a pore distribution, a circularity, and an ash content. A carbonaceous material having at least one property which is selected from these properties and is different from the property of the first carbonaceous material may be used as the conductive material.

A carbonaceous material having high conductivity, such as a graphite material, an amorphous material, or an activated carbon, may be used as the conductive material. Specific examples thereof include black leads (graphites) such as natural graphite or artificial graphites, carbon blacks such as acetylene black, and amorphous carbons such as needle coke. These may be used singly, or in combination of two or more kinds thereof. By adding a second carbonaceous material (conductive material), an effect such as decreasing the resistance of an electrode can be exhibited.

In a case in which the anode mixture includes a conductive material, the range of the content of the conductive material with respect to the mass of the anode mixture is as follows. The lower limit of the range is 1% by mass or more, preferably 2% by mass or more, and more preferably 3% by mass or more. The upper limit thereof is 45% by mass or less, and preferably 40% by mass or less. When the content of the conductive material is 1% by mass or more, an effect of improving conductivity tends to be easily obtained. When the content of the conductive material is 45% by mass or less, an increase in initial irreversible capacity tends to be suppressed.

(Binder)

It is preferable that the anode mixture includes a binder. The kind of the binder is not particularly limited. The binder may be selected from, for example, materials stable in a dispersion solvent used for forming a non-aqueous electrolytic solution and an electrode.

Specific examples thereof include: resinous polymers such as polyethylene, polypropylene, polyethylene terephthalate, polymethyl methacrylate, aromatic polyamides, cellulose, or nitrocellulose; rubber-like polymers such as SBR (styrene-butadiene rubber), isoprene rubber, butadiene rubber, fluororubber, NBR (acrylonitrile-butadiene rubber), or ethylene-propylene rubber; styrene-butadiene-styrene block copolymer or a hydrogenated product thereof; thermoplastic elastomer polymers such as EPDM (ethylene-propylene-diene tercopolymer), styrene-ethylene-butadiene-styrene copolymer, or styrene-isoprene-styrene block copolymer or a hydrogenated product thereof; soft resinous polymers such as syndiotactic-1,2-polybutadiene, polyvinyl acetate, ethylene-vinyl acetate copolymer, or propylene-α-olefin copolymer; fluorine-containing polymers such as polyvinylidene fluoride, polytetrafluoroethylene, fluorinated polyvinylidene fluoride, or polytetrafluoroethylene-ethylene copolymer; and polymeric compositions having alkali metal ion (particularly, lithium ion) conductivity. These may be used singly, or in combination of two or more kinds thereof.

In a case in which the anode mixture contains a binder, the content of a binder is preferably 0.1% by mass or more, more preferably 0.2% by mass or more, and still more preferably 0.5% by mass or more, with respect to the total amount of the anode mixture. The content of a binder is preferably 20% by mass or less, more preferably 15% by mass or less, still more preferably 10% by mass or less, and particularly preferably 8% by mass or less, with respect to the total amount of the anode mixture.

In a case in which the content of a binder is 20% by mass or less, the proportion of the binder that does not contribute to battery capacity is reduced, whereby a decrease in battery capacity tends to be suppressed. In a case in which the content of a binder is 0.1% by mass or more, a decrease in strength of the anode mixture tends to be suppressed.

In a case in which a rubber-like polymer exemplified by SBR is used as a principal constituent of a binder, the content thereof is preferably 0.1% by mass or more, more preferably 0.2% by mass or more, and still more preferably 0.5% by mass or more, with respect to the total amount of the anode mixture. The content is preferably 5% by mass or less, more preferably 3% by mass or less, and still more preferably 2% by mass or less, with respect to the total amount of the anode mixture.

In a case in which a fluorine-containing polymer exemplified by polyvinylidene fluoride is used as a principal constituent of a binder, the content thereof is preferably 1% by mass or more, more preferably 2% by mass or more, and still more preferably 3% by mass or more, with respect to the total amount of the anode mixture. The content is preferably 15% by mass or less, more preferably 10% by mass or less, and still more preferably 8% by mass or less, with respect to the total amount of the anode mixture.

A method of forming an anode mixture on a current collector is not particularly limited, and examples thereof include a dry method and a wet method, such as those mentioned with respect to the method of forming a cathode mixture.

In a case in which the anode mixture is formed by a wet method, a dispersion solvent and a thickening material for forming a slurry are not particularly limited, and may be selected from the dispersion solvents and thickening materials exemplified as the dispersion solvents and thickening materials usable in the cathode mixture.

In a case in which a thickening material is used, the content thereof is preferably 0.1% by mass or more, more preferably 0.2% by mass or more, and still more preferably 0.5% by mass or more, with respect to the total amount of the anode mixture. The content is preferably 5% by mass or less, more preferably 3% by mass or less, and still more preferably 2% by mass or less, with respect to the total amount of the anode mixture.

When the content of a thickening material is 0.1% by mass or more, the application properties of a slurry tend to be favorably maintained. When the content of a thickening agent is 5% by mass or more, the proportion of an anode active material with respect to an anode mixture is reduced, whereby a decrease in battery capacity, an increase in resistance in the anode active material, or the like tends to be suppressed.

(Current Collector)

The material of a current collector for an anode is not particularly limited. Examples thereof include metallic materials such as copper, nickel, stainless steel, or nickel-plated steel. Among them, copper is preferred from the viewpoint of the easiness of working and a cost.

The shape of a current collector is not particularly limited. Examples thereof include metal foils (metallic thin films), metal columns, metal coils, metal plates, metallic thin films, expanded metals, punched metals, and metal foams. Among them, a metal foil is preferred. Examples of a copper foil include a rolled copper foil formed by a rolling method and an electrolytic copper foil formed by an electrolytic method, each of which is preferred as the current collector.

The thickness of a current collector is not particularly limited. In a case in which a current collector is made of copper and has a thickness of less than 25 μm, use of a copper alloy (such as phosphor bronze, copper titanium, Corson alloy, or Cu—Cr—Zr alloy) superior in strength to pure copper is preferred from the viewpoint of improving the strength of the current collector.

3. Electrolytic Solution

The electrolytic solution according to an embodiment of the invention is obtained by dissolving a lithium salt as an electrolyte in a non-aqueous solvent. The lithium salt includes lithium hexafluorophosphate ($LiPF_6$). The electrolytic solution may include an additive, if necessary.

The electrolytic solution may further include a lithium salt other than lithium hexafluorophosphate ($LiPF_6$). Examples of the lithium salt other than lithium hexafluorophosphate ($LiPF_6$) include: inorganic fluoride salts such as $LiBF_4$, $LiAsF_6$, or $LiSbF_6$; perhalates such as $LiClO_4$, $LiBrO_4$, or $LiIO_4$; inorganic chloride salts such as $LiAlCl_4$; perfluoroalkanesulfonate salts such as $LiCF_3SO_3$; perfluoroalkanesulfonyl imide salts such as $LiN(CF_3SO_2)_2$, $LiN(CF_3CF_2SO_2)_2$, or $LiN(CF_3SO_2)(C_4F_9SO_2)$; perfluoroalkanesulfonyl methide salts such as $LiC(CF_3SO_2)_3$; fluoroalkylfluorophosphate salts such as $Li[PF_5(CF_2CF_2CF_3)]$, $Li[PF_4(CF_2CF_2CF_3)_2]$, $Li[PF_3(CF_2CF_2CF_3)_3]$, $Li[PF_5(CF_2CF_2CF_2CF_3)]$, $Li[PF_4(CF_2CF_2CF_2CF_3)_2]$, or $Li[PF_3(CF_2CF_2CF_2CF_3)_3]$; and lithium salts containing a dicarboxylic acid complex, such as lithium bis(oxalato)borate or lithium difluorooxalatoborate.

In a case in which the electrolytic solution includes a lithium salt other than lithium hexafluorophosphate ($LiPF_6$), the content of lithium hexafluorophosphate ($LiPF_6$) is preferably 10% by mass or more, and more preferably 50% by mass or more, with respect to the total amount of lithium salts, from the viewpoint of battery performance.

The concentration of lithium salt (electrolyte) in an electrolytic solution is not particularly limited. For example, the concentration may be 0.5 mol/L or more, and is preferably 0.6 mol/L or more, and more preferably 0.7 mol/L or more. The upper limit of the concentration may be 2 mol/L or less, and is preferably 1.8 mol/L or less, and more preferably 1.7 mol/L or less. When the concentration of lithium salt (electrolyte) is 0.5 mol/L or more, a sufficient electric conductivity tends to be obtained. When the concentration of lithium salt (electrolyte) is 2 mol/L or less, a viscosity tends to be inhibited from increasing, thereby decreasing an electric conductivity, and the deterioration of the performance of the lithium ion secondary battery tends to be suppressed.

The kind of the non-aqueous solvent is not particularly limited. Examples thereof include cyclic carbonates, chain carbonates, chain esters, cyclic ethers, and chain ethers. These non-aqueous solvents may be used singly, or in combination of two or more kinds thereof.

Preferred examples of a cyclic carbonate include cyclic carbonates including an alkylene group having from 2 to 6 carbon atoms, and more preferably from 2 to 4 carbon atoms. Specific examples thereof include ethylene carbonate, propylene carbonate, and butylene carbonate. Among them, ethylene carbonate or propylene carbonate is preferred. Such a cyclic carbonate may also be a cyclic carbonate having a double bond in a molecule thereof, such as vinylene carbonate or fluoroethylene carbonate, or a cyclic carbonate containing a halogen atom. In a case in which a carbon material is used as an anode active material, vinylene carbonate is preferably included from the viewpoint of cycle characteristics.

Preferred examples of a chain carbonate include dialkyl carbonates, preferably including two alkyl groups each of which independently has from 1 to 5 carbon atoms, and more preferably from 1 to 4 carbon atoms. Specific examples thereof include symmetric chain carbonates such as dimethyl carbonate, diethyl carbonate, or di-n-propyl carbonate, and asymmetric chain carbonates such as methylethyl carbonate, methyl-n-propyl carbonate, or ethyl-n-propyl carbonate. Among them, dimethyl carbonate, diethyl carbonate, and methylethyl carbonate are preferred.

Examples of a chain ester include methyl acetate, ethyl acetate, propyl acetate, and methyl propionate. Among them, methyl acetate is preferred from the viewpoint of improving low-temperature characteristics.

Examples of a cyclic ether include tetrahydrofuran, 2-methyltetrahydrofuran, and tetrahydropyran. Among them, tetrahydrofuran is preferred from the viewpoint of improving input-output characteristics.

Examples of a chain ether include dimethoxyethane and dimethoxymethane.

The non-aqueous solvents may be used singly, or in combination of two or more kinds thereof. However, it is preferable that the non-aqueous solvents are used in combination of two or more kinds thereof. For example, it is preferable to use a combination of a high-dielectric-constant solvent such as a cyclic carbonate, and a low-viscosity solvent such as a chain carbonate or a chain ester.

One of preferred combinations thereof is a combination of a cyclic carbonate and a chain carbonate. In particular, preferred examples thereof include combinations in which the total content of a cyclic carbonate and a chain carbonate is 80% by volume or more, preferably 85% by volume or more, and more preferably 90% by volume or more, with respect to the total amount of the non-aqueous solvent, and the volume of the cyclic carbonate with respect to the total amount of the cyclic carbonate and the chain carbonate is in the following ranges. The lower limit of the volume of a cyclic carbonate is 5% by volume or more, preferably 10% by volume or more, and more preferably 15% by volume or more, and the upper limit thereof is 50% by volume or less, preferably 35% by volume or less, and more preferably 30% by volume or less. Use of such a combination of non-aqueous solvents tends to result in improvement in cycle characteristics and storage characteristics of the battery.

Specific examples of preferred combinations of a cyclic carbonate and a chain carbonate include a combination of ethylene carbonate and dimethyl carbonate, a combination of ethylene carbonate and diethyl carbonate, a combination of ethylene carbonate and methylethyl carbonate, a combination of ethylene carbonate, dimethyl carbonate, and diethyl carbonate, a combination of ethylene carbonate, dimethyl carbonate, and methylethyl carbonate, a combination of ethylene carbonate, diethyl carbonate, and methylethyl carbonate, and a combination of ethylene carbonate, dimethyl carbonate, diethyl carbonate, and methylethyl carbonate.

Of the combinations, a combination containing a symmetric chain carbonate and an asymmetric chain carbonate as chain carbonates is preferred. Specific examples thereof include a combination of ethylene carbonate, dimethyl carbonate, and methylethyl carbonate, a combination of ethylene carbonate, diethyl carbonate, and methylethyl carbonate, and a combination of ethylene carbonate, dimethyl carbonate, diethyl carbonate, and methylethyl carbonate.

Cycle characteristics and input-output characteristics can be improved by combining ethylene carbonate, a symmetric chain carbonate, and an asymmetric chain carbonate. Among them, combinations in which the asymmetric chain carbonate is methylethyl carbonate are preferred, and combinations in which a dialkyl carbonate includes an alkyl group having from 1 to 2 carbon atoms are preferred.

The additive is not particularly restricted as long as it is an additive for a non-aqueous electrolytic solution in a lithium ion secondary battery. Examples thereof include a heterocyclic compound containing at least one of nitrogen or sulfur, a cyclic carboxylic acid ester, a fluorine-containing cyclic carbonate, and another compound having an unsaturated bond in a molecule thereof.

In addition to the additive, another additive such as an overcharge prevention material, an anode coating film formation material, a cathode protection material, or a high input/output material may also be used according to a demanded function.

4. Separator

The separator is not particularly limited as long as it has ion permeability while achieving electrical insulation between the cathode and the anode, and having resistance to oxidization at a cathode side and reduction at a anode side. A resin, an inorganic substance, a glass fiber, or the like is used as the material (material quality) of the separator satisfying such characteristics.

An olefinic polymer, fluorine-containing polymer, cellulose-based polymer, polyimide, nylon, or the like is used as the resin. Specifically, it is preferable to select a resin from materials stable to a non-aqueous electrolytic solution and have superior liquid retaining properties, and it is preferable to use a porous sheet, a non-woven fabric, or the like in which a polyolefin such as polyethylene or polypropylene is used as a raw material.

An oxide such as alumina or silicon dioxide, a nitride such as aluminum nitride or silicon nitride, a sulfate such as barium sulfate or calcium sulfate, or the like is used as the inorganic substance. For example, a separator obtained by attaching an inorganic substance having a fiber or particle shape to a substrate having the shape of a thin film such as a non-woven fabric, a woven fabric, or a microporous film may be used as a separator. A substrate having a pore diameter of from 0.01 µm to 1 µm and a thickness of from 5 µm to 50 µm is preferably used as a substrate having a thin film shape. For example, a composite porous layer into which the inorganic substance having a fiber or particle shape is made using a binder such as a resin may be used as a separator. The composite porous layer may be formed on a surface of the cathode or anode, thereby making a separator. For example, a composite porous layer obtained by binding alumina particles having a 90% particle diameter of less than 1 µm with the use of a fluorine resin as a binder may also be formed on a surface of the cathode.

5. Other Configuration Members

A cleavage valve may also be arranged as another configuration member of a lithium ion secondary battery. By opening the cleavage valve, it is possible to suppress an increase in pressure in the battery, and improve the safety.

A configuration unit which releases an inert gas (such as carbon dioxide) with an increase in temperature may also be arranged. By arranging such a configuration unit, the cleavage valve may be rapidly opened owing to the generation of an inert gas, in a case in which temperature in the battery increases, leading to improvement in safety. Examples of materials used in the configuration unit include lithium carbonate and polyalkylene carbonate resin.

(Lithium Ion Secondary Battery)

First, an embodiment in which the invention is applied to a laminate-type lithium ion secondary battery will be described.

The laminate-type lithium ion secondary battery may be produced, for example, as described below. First, a cathode and an anode are cut into rectangular shapes, and a tab is welded to each of the electrodes to produce a cathode terminal and an anode terminal. A layered body in which the cathode, an insulating layer, and the anode are layered in this order is produced, and is housed in this state in a laminate pack made of aluminum. The cathode and anode terminals are put outside the aluminum laminate pack, and the laminate pack is sealed. Then, non-aqueous electrolyte is injected into the aluminum laminate pack, and the opening of the aluminum laminate pack is sealed. As a result, the lithium ion secondary battery is obtained.

An embodiment in which the invention is applied to a 18650-type columnar lithium ion secondary battery will now be described with reference to the drawing.

As illustrated in FIG. 1, a lithium ion secondary battery 1 of the present embodiment includes a battery container 6 which is made of nickel-plated steel and has a bottomed cylindrical shape. An electrode group 5 obtained by cross-sectionally spirally winding a belt-shaped cathode plate 2 and an anode plate 3 between which a separator 4 is interposed is housed in the battery container 6. The cathode plate 2 and the anode plate 3 between which the separator 4 which is a porous sheet made of polyethylene is interposed are cross-sectionally spirally wound in the electrode group 5. For example, the width and thickness of the separator 4 are set at 58 mm and 30 µm, respectively. A cathode tab terminal of which one end is fixed to the cathode plate 2, and which is made of aluminum and has a ribbon shape is protruded through the upper end surface of the electrode group 5. By ultrasonic welding, the other end of the cathode tab terminal is joined to the under surface of a disc-shaped battery lid which is arranged in the upper side of the electrode group 5 and becomes a cathode external terminal. An anode tab terminal of which one end is fixed to the anode plate 3, and which is made of copper and has a ribbon shape is protruded through the lower end surface of the electrode group 5. The other end of the anode tab terminal is joined to the inner bottom of the battery container 6 by resistance welding. Accordingly, the cathode tab terminal and the anode tab terminal are protruded through the end surfaces of the electrode group 5, which are sides opposite to each other, respectively. An insulating coating, of which an illustration is omitted, is formed on the entire periphery of the outer peripheral surface of the electrode group 5. A battery lid is swaged and fixed to the upper portion of the battery container 6 so that a gasket made of an insulating resin is interposed between the battery lid and the upper portion. Therefore, the interior of the lithium ion secondary battery 1 is sealed. A non-aqueous electrolytic solution, which is not illustrated, is injected into the battery container 6.

In the present embodiment, the capacity ratio between the anode and the cathode (anode capacity/cathode capacity) is preferably from 1.03 to 1.8, and more preferably from 1.05 to 1.4, from the viewpoint of safety and an energy density.

The anode capacity represents [discharge capacity of anode], and the cathode capacity represents [initial charging capacity of cathode–irreversible capacity of either anode or cathode, whichever is greater]. [Discharge capacity of anode] is defined as a discharge capacity calculated by a charge/discharge apparatus in a case in which lithium ions inserted into an anode active material are desorbed. [Initial charging capacity of cathode] is defined as an initial charging capacity calculated by a charge/discharge apparatus in a case in which lithium ions are desorbed from a cathode active material.

The capacity ratio between the anode and the cathode may also be calculated from, for example, "discharge capacity of lithium ion secondary battery/discharge capacity of anode". The discharge capacity of the lithium ion secondary battery can be measured under conditions, for example, in a case in which constant-current constant-voltage (CCCV) charging is performed at 4.35 V and from 0.1 C to 0.5 C for a cutoff time of from 2 to 15 hours, and constant-current (CC) discharging is then performed at from 0.1 C to 0.5 C until 2.5 V is achieved. The discharge capacity of the anode may be calculated by measuring a discharge capacity per predetermined area under conditions in a case in which the anode used in the measurement of the discharge capacity of the lithium ion secondary battery is cut into a predetermined area, a single electrode cell is produced by interposing a separator impregnated with an electrolytic solution between the cut anode and a lithium metal used as a counter electrode, constant-current constant-voltage (CCCV) charging is performed at 0 V and from 0.1 C to 0.5 C for a cutoff current of 0.01 C, and constant-current (CC) discharging is then performed at from 0.1 C to 0.5 C until 1.5 V is achieved, and by converting the discharge capacity per predetermined area into the total area used as the anode of the lithium ion secondary battery. In the single electrode cell, the direction of the insertion of lithium ions into the anode active material is defined as charging, and the direction of the desorption of lithium ions inserted into the anode active material is defined as discharging. "C" means "current value (A)/discharge capacity (Ah) of battery".

EXAMPLES

Hereinbelow, the embodiments of the present invention are described in more detail with reference to examples. The invention is not limited to the following examples.

Production Example 1

<Production of Aluminum Oxide>
An aqueous sodium orthosilicate solution (500 mL) having a concentration of 350 mmol/L was added to an aqueous aluminum chloride solution (500 mL) having a concentration of 700 mmol/L, and the resultant was stirred for 30 minutes. To this solution, 330 mL of an aqueous sodium hydroxide solution having a concentration of 1 mol/L was added to adjust the pH of the solution to 6.1.

The solution after the pH adjustment was stirred for 30 minutes, and then subjected to centrifugation at a rotational speed of 3,000 $min^{-1}$ for 5 minutes using a centrifugal separator (SUPREMA 23 and standard rotor NA-16, manufactured by TOMY SEIKO CO., LTD.). After the centrifugation, a supernatant solution was discharged, and a gelatinous precipitate was re-dispersed in pure water to re-achieve the volume prior to the centrifugation. The deionization treatment by such centrifugation was performed four times.

To a gelatinous precipitate obtained after the discharge of a supernatant in the fourth deionization treatment, 135 mL of hydrochloric acid having a concentration of 1 mol/L was added to adjust the pH of the resultant to 3.5, and the resultant was stirred for 30 minutes. Then, this solution was put in a drier, and heated at 98° C. for 48 hours (2 days). To the heated solution (salt concentration of 47 g/L), 188 mL of an aqueous sodium hydroxide solution having a concentration of 1 mol/L was added to adjust the pH of the resultant to 9.1. The salt in the solution was allowed to aggregate by adjusting the pH, the aggregate was precipitated by centrifugation similar to the centrifugation described above, and a supernatant liquid was then discharged. A deionization treatment in which pure water was added to the precipitate after the discharge of the supernatant liquid to re-achieve the volume prior to the centrifugation was performed four times. A gelatinous precipitate obtained after the discharge of a supernatant in the fourth deionization treatment was dried at 60° C. for 16 hours, thereby collecting 30 g of a particulate agglomerate. The particulate agglomerate was ground using a jet mill, to thereby produce a particulate aluminum oxide.

<Production of Carbon-Coated Aluminum Oxide>
The aluminum oxide was mixed with a polyvinyl alcohol powder (Wako Pure Chemical Industries, Ltd.) at a mass ratio of 100:70 (aluminum oxide:polyvinyl alcohol powder), and the mixture was baked at 850° C. for 1 hour under a nitrogen atmosphere, thereby producing a particulate carbon-coated aluminum oxide.

Production Example 2

<Production of Aluminum Oxide>
Water glass (silicate soda No. 3, $Na_2O.nSiO_2.mH_2O$) (200 mL) having a Si concentration of 2 mol/L was added to an aqueous aluminum sulfate solution (800 mL) having an Al concentration of 1 mol/L, and the resultant was stirred for 30 minutes. To this solution, 1,900 mL of an aqueous sodium hydroxide solution having a concentration of 1 mol/L was added to adjust the pH of the solution to 7. The solution after the pH adjustment was stirred for 30 minutes, and then subjected to deionization by pressure filtration. To a precipitate after the deionization treatment, 90 mL of sulfuric acid having a concentration of 1 mol/L was added to adjust the pH of the resultant to 4, and the resultant was stirred for 30 minutes. Then, this solution was put in a drier, and heated at 98° C. for 48 hours (2 days). To the heated solution, 330 mL of an aqueous sodium hydroxide solution having a concentration of 1 mol/L was added to adjust the pH of the resultant to 9. The salt in the solution was allowed to aggregate by adjusting the pH, and this aggregate was precipitated by pressure filtration similar to the pressure filtration described above. Then, a supernatant liquid was discharged, and deionization was performed. A precipitate obtained by the deionization treatment was dried at 110° C. for 16 hours, thereby collecting a particulate agglomerate. The particulate agglomerate was ground using a jet mill, to thereby obtain a particulate aluminum oxide.

<Production of Carbon-Coated Aluminum Oxide>

A particulate carbon-coated aluminum oxide was produced in the same manner as in Production Example 1 described above.

Production Example 3

<Production of Aluminum Oxide>

Water glass (silicate soda No. 3, $Na_2O.nSiO_2.mH_2O$) (500 mL) having a Si concentration of 2 mol/L was added to an aqueous aluminum sulfate solution (500 mL) having an Al concentration of 1 mol/L, and the resultant was stirred for 30 minutes. To this solution, 890 mL of an aqueous sodium hydroxide solution having a concentration of 1 mol/L was added to adjust the pH of the solution to 7. The solution after the pH adjustment was stirred for 30 minutes, and then subjected to deionization by pressure filtration. To a precipitate after the deionization treatment, 100 mL of sulfuric acid having a concentration of 1 mol/L was added to adjust the pH of the resultant to 4, and the resultant was stirred for 30 minutes. Then, this solution was put in a drier, and heated at 98° C. for 48 hours (2 days). To the heated solution, 235 mL of an aqueous sodium hydroxide solution having a concentration of 1 mol/L was added to adjust the pH of the resultant to 9. The salt in the solution was allowed to aggregate by adjusting the pH, this aggregate was precipitated by pressure filtration similar to the pressure filtration described above, a supernatant liquid was then discharged, and deionization was performed. A precipitate obtained by the deionization treatment was dried at 110° C. for 16 hours, thereby collecting a particulate agglomerate. The particulate agglomerate was ground using a jet mill, to thereby produce a particulate aluminum oxide.

<Production of Carbon-Coated Aluminum Oxide>

A particulate carbon-coated aluminum oxide was produced in the same manner as in Production Example 1 described above.

Production Example 4

Commercially-available saponite (trade name: SUMECTON SA (KUNIMINE INDUSTRIES CO., LTD. Co., Ltd.)) was used as a core material. The saponite was ground using a jet mill, to thereby produce a particulate aluminum oxide.

<Production of Carbon-Coated Aluminum Oxide>

A particulate carbon-coated aluminum oxide was produced in the same manner as in Production Example 1 described above.

Example 1

[Production of Cathode Plate]

A cathode plate was produced as described below. A mixture of cathode materials was obtained by sequentially adding and mixing lithium cobaltate (94% by mass) as a cathode active material, fibrous black lead (1% by mass) and acetylene black (AB) (1% by mass) as conductive materials, the carbon-coated aluminum oxide (1% by mass) produced in Production Example 1, and polyvinylidene fluoride (PVDF) (3% by mass) as a binder. The physical properties of the carbon-coated aluminum oxide, and the composition of the cathode are shown in Table 1. In Table 1, the total amount of the fibrous black lead (1% by mass) and the acetylene black (1% by mass) is described for the conductive materials.

Then, N-methyl-2-pyrrolidone (NMP) as a dispersion solvent was added to the mixture, followed by kneading, thereby obtaining a slurry. The slurry was applied to an aluminum foil having a thickness of 20 μm as a current collector for a cathode in such a manner that the applied slurry had a substantially uniform thickness and became homogeneous. Then, the resultant was subjected to a dry treatment, and compressed using a press until the resultant had a predetermined density. The density of the cathode mixture was set at 3.6 g/cm$^3$, and the single application amount of the cathode mixture was set at 202 g/m$^2$.

[Production of Anode Plate]

An anode plate was produced as described below. An artificial graphite having an average particle diameter of 22 μm was used as an anode active material. Styrene-butadiene rubber (SBR) as a binder, and carboxymethyl cellulose (trade name: CMC #2200, manufactured by Daicel Fine-Chem Ltd.) as a thickening material were added to the anode active material. The mass ratio thereof was set as follow: [anode active material:binder:thickening material=98:1:1]. Water as a dispersion solvent was added thereto, and the resultant was kneaded, thereby producing a slurry. The slurry was applied in a predetermined amount to both surfaces of a rolled copper foil having a thickness of 10 μm as a current collector for an anode in such a manner that the applied slurry had a substantially uniform thickness and became homogeneous. The density of the anode mixture was set at 1.65 g/cm$^3$, and the single application amount of the anode mixture was set at 113 g/m$^2$.

[Production of Battery]

An electrode for a cathode cut into a rectangular shape of 13.5 cm$^2$ was interposed between separators which were porous sheets made of polyethylene (trade name: HIPORE, manufactured by Asahi Kasei Corp., thickness of 30 μm, "HIPORE" is registered trademark), and an anode cut into a rectangular shape of 14.3 cm$^2$ was further layered thereon to produce a layered body. The layered body was put in an aluminum laminate container (trade name: ALUMINUM LAMINATE FILM, manufactured by Dai Nippon Printing Co., Ltd.), and 1 mL of an electrolytic solution was added thereto. An electrolytic solution (manufactured by Ube Industries, Ltd.) obtained by adding, to a mixed solution of ethylene carbonate/dimethyl carbonate/diethyl carbonate=2.5/6/1.5 (volume ratio) containing 1 mol/L of $LiPF_6$, vinylene carbonate in an amount of 1.0% by mass with respect to the total amount of the mixed solution was used as the electrolytic solution. Then, the aluminum laminate container was heat-welded, to thereby produce a laminate-type battery for electrode evaluation.

Example 2

A cathode and a battery were produced in the same manner as in the processes of Example 1 except that the proportion of lithium cobaltate as the cathode active material described in Example 1 was changed to 90% by mass, the proportion of the carbon-coated aluminum oxide produced in Production Example 1 was changed to 5% by mass, and the single application amount of the cathode mixture was changed to 211 g/m$^2$. The physical properties of the carbon-coated aluminum oxide, and the composition of the battery are shown in Table 1.

Example 3

A cathode and a battery were produced in the same manner as in the processes of Example 1 except that the proportion of lithium cobaltate as the cathode active material described in Example 1 was changed to 90% by mass, the proportion of the carbon-coated aluminum oxide produced in Production Example 1 was changed to 5% by mass, the single application amount of the cathode mixture was changed to 211 g/m$^2$, and a lithium salt in a non-aqueous electrolyte was a combination of 0.6 mol/L of LiPF$_6$ and 0.4 mol/L of LiBF$_4$. The physical properties of the carbon-coated aluminum oxide, and the composition of the battery are shown in Table 1.

Example 4

A cathode and a battery were produced in the same manner as in the processes described in Example 1 except that the proportion of lithium cobaltate as the cathode active material described in Example 1 was changed to 94% by mass, the proportion of the carbon-coated aluminum oxide produced by the method described in Production Example 2 was changed to 1% by mass, and the single application amount of the cathode mixture was changed to 202 g/m$^2$. The physical properties of the carbon-coated aluminum oxide, and the composition of the battery are shown in Table 1.

Example 5

A cathode and a battery were produced in the same manner as in the processes described in Example 4 except the carbon-coated aluminum oxide produced by the method described in Production Example 3 was used. The physical properties of the carbon-coated aluminum oxide, and the composition of the battery are shown in Table 1.

Example 6

A cathode and a battery were produced in the same manner as in the processes described in Example 4 except the carbon-coated aluminum oxide produced by the method described in Production Example 4 was used. The physical properties of the carbon-coated aluminum oxide, and the composition of the battery are shown in Table 1.

Example 7

A cathode and a battery were produced in the same manner as in the processes of Example 1 except that the proportion of lithium cobaltate as the cathode active material described in Example 1 was changed to 94.9% by mass, the proportion of the carbon-coated aluminum oxide produced in Production Example 1 was changed to 0.1% by mass, and the single application amount of the cathode mixture was changed to 200 g/m$^2$. The physical properties of the carbon-coated aluminum oxide, and the composition of the battery are shown in Table 1.

Example 8

A cathode and a battery were produced in the same manner as in the processes of Example 1 except that the proportion of lithium cobaltate as the cathode active material described in Example 1 was changed to 88% by mass, the proportion of the carbon-coated aluminum oxide produced in Production Example 1 was changed to 7% by mass, and the single application amount of the cathode mixture was changed to 214 g/m$^2$. The physical properties of the carbon-coated aluminum oxide, and the composition of the battery are shown in Table 1.

Comparative Example 1

A cathode and a battery were produced in the same manner as in the processes of Example 1 except that the proportion of lithium cobaltate as the cathode active material described in Example 1 was changed to 95% by mass, such a carbon-coated aluminum oxide as described in the production examples was not added, and the single application amount of the cathode mixture was changed to 200 g/m$^2$. The composition of the battery is shown in Table 1.

Comparative Example 2

A cathode and a battery were produced in the same manner as in the processes of Example 1 except that the proportion of lithium cobaltate as the cathode active material described in Example 1 was changed to 90% by mass, the proportion of the carbon-coated aluminum oxide produced in Production Example 1 was changed to 5% by mass, the single application amount of the cathode mixture was changed to 211 g/m$^2$, and a lithium salt in a non-aqueous electrolyte was 1 mol/L of LiBF$_4$. The physical properties of the carbon-coated aluminum oxide, and the composition of the battery are shown in Table 1.

[Evaluation of Physical Properties of Powder]
<Measurement of Mass Loss Rates>

The mass loss rate of the carbon-coated aluminum oxide was calculated by measurement using a differential thermal-thermogravimetric analyzer (TG-DTA) TG-DTA-6200 type (SII NanoTechnology Inc.). The mass loss rate was measured in such a manner that a temperature was maintained at 850° C. for 20 minutes at a temperature-raising rate of 10° C./min under the flow of dry air. In this case, the mass loss rates were determined as the values of D1 determined by the above-described Expression (1) and D2 determined by the above-described Expression (2) on the basis of a mass (W0) at 25° C., a mass (W1) at 350° C., and a mass (W2) at 850° C., measured by TG-DTA. The results are shown in Table 1.

<Measurement of Specific Surface Area>

The BET specific surface area of the carbon-coated aluminum oxide was measured based on a nitrogen adsorption ability in accordance with JIS Z 8830 (2001). A nitrogen adsorption measurement apparatus (AUTOSORB-1, available from QUANTACHROME) was used as an evaluation apparatus. In the BET specific surface area measurement, a pretreatment of removing water by heating was first performed, since the water adsorbed on a surface of a sample and in the structure of the sample was supposed to affect the gas adsorption ability.

In the pretreatment, 0.05 g of a measurement sample was put in a measurement cell, and the measurement cell was depressurized to 10 Pa or less using a vacuum pump, then heated at 110° C., and maintained for 3 hours or more. Then, the cell was naturally cooled to ordinary temperature (25° C.) while keeping the depressurization state. After the pretreatment, measurement was carried out in an evaluation pressure range of less than 1 on a relative pressure (equilibrium pressure with respect to saturated vapor pressure) basis at an evaluation temperature set at 77 K. The results are shown in Table 1.

<Measurement of Average Particle Diameter>

The volume average particle diameter of the carbon-coated aluminum oxide was measured using a laser diffraction particle size analyzer (such as SALD3000J, available from SHIMADZU CORPORATION). Specifically, the carbon-coated aluminum oxide was dispersed in a dispersion medium such as water to prepare a dispersion liquid. For the dispersion liquid, a particle diameter (D50) achieving an accumulation of 50% was determined as the volume average particle diameter in a case in which a volume cumulative distribution curve was drawn from a smaller-diameter side by using the laser diffraction particle size analyzer. The results are shown in Table 1.

[Evaluation of Battery Capacity]

The battery characteristics of the lithium ion secondary batteries produced as described above were evaluated by a method described below. First, constant-current charging at a current value of 0.1 C under an environment at 25° C. was performed until an upper limit voltage of 4.35 V was achieved, followed by constant-voltage charging at 4.35 V. A charge cutoff condition was set at a current value of 0.01 C. Then, constant-current discharging at a cutoff voltage of 2.5 V was performed at a current value of 0.1 C. This charge/discharge cycle was repeated three times. "C" used as the unit of a current value means "current value (A)/battery capacity (Ah)". Then, constant-current charging at 0.2 C was performed until an upper limit voltage of 4.35 V was achieved, followed by constant-voltage charging at 4.35 V (a charge cutoff condition was set at a current value of 0.02 C). Subsequently, constant-current discharging at a cutoff voltage of 2.5 V was performed at a current value of 0.2 C, and a capacity in the discharging was regarded as a battery capacity.

[Evaluation of Output Characteristics]

Output characteristics were calculated as described below.

After the measurement of battery capacity, constant-current charging at 0.2 C was performed until an upper limit voltage of 4.35 V was achieved, followed by constant-voltage charging performed at 4.35 V. A charge cutoff condition was set at a current value of 0.02 C. Then, constant-current discharging at a cutoff voltage of 2.5 V was performed at a current value of 0.2 C, and a capacity in the discharging was regarded as a discharge capacity at a current value of 0.2 C. Then, constant-current charging at 0.2 C was performed until an upper limit voltage 4.35 V was achieved, followed by constant-voltage charging performed at 4.35 V (a charge cutoff condition was set at a current value of 0.02 C). Then, constant-current discharging at a cutoff voltage of 2.5 V was performed at a current value of 3 C, a capacity in the discharging was regarded as a discharge capacity at a current value of 3 C, and the output characteristics were calculated based on the following equation.

Output characteristic (%)=(discharge capacity at current value of 3 C)/(discharge capacity at current value of 0.2 C)×100

The output characteristics of the batteries in which the cathodes described in Examples 1 to 8 and Comparative Examples 1 and 2 were used are shown in Table 1.

[Evaluation of Cycle Characteristics]

After the evaluation of output characteristics under the conditions described above, cycle characteristics were evaluated by a cycle test in which charging and discharging were repeated. In a charging pattern, each lithium battery was subjected to constant-current charging at a current value of 1 C under an environment at 50° C. until an upper limit voltage of 4.35 V was achieved, followed by constant-voltage charging performed at 4.35 V. A charge cutoff condition was set at a current value of 0.1 C. As the discharging, constant-current discharging at 1 C was performed until 2.5 V was achieved. The cycle characteristics were calculated based on the following equation. The test results are shown in Table 1.

Cycle characteristic (%)=(discharge capacity after 200th cycle at current value of 1 C/discharge capacity after first cycle at current value of 1 C)×100

The output characteristics of the batteries in which the cathodes described in Examples 1 to 8 and Comparative Examples 1 and 2 were used are shown in Table 1.

TABLE 1

| | Item | | Example 1 | 2 | 3 | 4 | 5 | 6 | 7 | 8 | Comparative Example 1 | 2 |
|---|---|---|---|---|---|---|---|---|---|---|---|---|
| Cathode | Carbon-coated aluminum oxide | D1 (%) | 2.1 | 2.1 | 2.1 | 0.9 | 1.8 | 4.8 | 2.1 | 2.1 | — | 2.1 |
| | | D2 (%) | 14.7 | 14.7 | 14.7 | 15.7 | 15 | 18.2 | 14.7 | 14.7 | — | 14.7 |
| | | Specific surface area ($m^2/g$) | 8 | 8 | 8 | 40 | 61 | 29 | 8 | 8 | — | 8 |
| | | Average particle diameter (μm) | 3.5 | 3.5 | 3.5 | 4.8 | 3.0 | 6.7 | 3.5 | 3.5 | — | 3.5 |
| | | Content (% by mass) | 1 | 5 | 5 | 1 | 1 | 1 | 0.1 | 7 | — | 5 |
| | Cathode active material (% by mass) | | 94 | 90 | 90 | 94 | 94 | 94 | 94.9 | 88 | 95 | 90 |
| | Conductive aid (% by mass) | | 2 | 2 | 2 | 2 | 2 | 2 | 2 | 2 | 2 | 2 |
| | Binder (% by mass) | | 3 | 3 | 3 | 3 | 3 | 3 | 3 | 3 | 3 | 3 |
| Lithium salt | $LiPF_6$ (mol/L) | | 1.0 | 1.0 | 0.6 | 1.0 | 1.0 | 1.0 | 1.0 | 1.0 | 1.0 | — |
| | $LiBF_4$ (mol/L) | | — | — | 0.4 | — | — | — | — | — | — | 1.0 |
| Battery characteristics | Output characteristic (%) | | 61 | 63 | 59 | 60 | 60 | 59 | 61 | 63 | 59 | 12 |
| | Cycle characteristic (%) | | 79 | 81 | 84 | 78 | 81 | 77 | 78 | 81 | 74 | 87 |

As shown in the results of Table 1, it was confirmed that Examples 1 to 3, 7, and 8 in which the carbon-coated aluminum oxide produced in Production Example 1 was contained resulted in improvement in output and cycle characteristics as compared to Comparative Example 1. It is estimated that the output characteristics were improved because of the high conductivity of the carbon-coated aluminum oxide. It is estimated that a decrease in capacity after the cycle test was able to be suppressed because the carbon-coated aluminum oxide adsorbed hydrogen fluoride (HF) in the electrolytic solution, whereby the deposition of lithium fluoride as a resistance constituent, and the change of the crystal structure of the cathode active material were able to be suppressed. Alternatively, it is estimated that this was because metal ions such as cobalt eluted from the cathode active material were adsorbed to suppress metal deposition on the anode, whereby a decrease in capacity after the cycle test was suppressed.

It was confirmed that the system in which the cathode including the carbon-coated aluminum oxide produced in Production Example 1, and the lithium salt in which $LiPF_6$ and $LiBF_4$ were mixed were applied, as described in Example 3, resulted in the approximately equivalent output characteristic but in the greatly improved cycle characteristic as compared to Comparative Example 1. It is estimated that this was because the incorporation of the carbon-coated aluminum oxide caused metal ions such as hydrogen fluoride and cobalt to be adsorbed, and therefore, a decrease in capacity after the cycle test was suppressed.

It was confirmed that Examples 4 to 6 in which the carbon-coated aluminum oxides produced by production methods (Production Examples 2 to 4) different from the production method of Production Example 1 were added also resulted in improvement in the output and cycle characteristics equivalent or superior to those in Comparative Example 1. It is estimated that this was also because a decrease in capacity was suppressed by the same reason as described above.

It was confirmed that the battery in which $LiPF_6$ was not included in the lithium salt as described in Comparative Example 2 resulted in the favorable cycle characteristic but in the low evaluation of the output characteristic.

The entire disclosure of Japanese Patent Application No. 2014-254729 is incorporated herein by reference. All documents, patent applications, and technical standards described in this specification are herein incorporated by reference to the same extent as if each individual document, patent application, or technical standard was specifically and individually indicated to be incorporated by reference.

What is claimed is:

1. A lithium ion secondary battery, comprising:
a cathode;
an anode:
a separator; and
an electrolytic solution comprising a lithium salt,
wherein the cathode comprises a current collector and a cathode mixture formed on the current collector,
wherein the cathode mixture comprises particles of aluminum silicate coated with carbon, and
wherein the particles of aluminum silicate coated with carbon have a mass loss rate of from 0.5% to 30% at from 350° C. to 850° C., measured using a differential thermal-thermogravimetric analyzer (TG-DTA).

2. The lithium ion secondary battery according to claim 1, wherein the particles of aluminum silicate coated with carbon have a mass loss rate of less than 5% at from 25° C. to 350° C., measured using a differential thermal-thermogravimetric analyzer (TG-DTA).

3. The lithium ion secondary battery according to claim 1, wherein the particles of aluminum silicate coated with carbon have has a specific surface area of from 1 $m^2$/g to less than 80 $m^2$/g, determined by nitrogen adsorption measurement at 77 K.

4. The lithium ion secondary battery according to claim 1, wherein the particles of aluminum silicate coated with carbon have a volume mean particle diameter of from 0.5 μm to less than 10 μm, measured by a laser diffraction particle size analyzer.

5. The lithium ion secondary battery according to claim 1, wherein a content of the particles of aluminum silicate coated with carbon is from 0.1% by mass to 10% by mass with respect to a total amount of the cathode mixture.

6. The lithium ion secondary battery according to claim 1, wherein the particles of aluminum silicate coated with carbon comprise an amorphous aluminum silicate compound.

7. The lithium ion secondary battery according to claim 1, wherein the cathode mixture comprises lithium cobaltate as a cathode active material.

8. The lithium ion secondary battery according to claim 1, wherein the lithium salt comprises lithium hexafluorophosphate ($LiPF_6$).

9. The lithium ion secondary battery according to claim 1, wherein the particles of aluminum silicate are coated with carbon by a process comprising contacting the particles of aluminum silicate with an organic compound and then subjecting the particles of aluminum silicate and organic compound to heat treatment.

10. The lithium ion secondary battery according to claim 1, wherein a part or an entirety of surfaces of particles of aluminum silicate are coated with carbon, to form the particles of aluminum silicate coated with carbon, prior to applying the cathode mixture on the current collector.

* * * * *